United States Patent
Ogino (10) Patent No.: US 9,912,858 B2
(45) Date of Patent: Mar. 6, 2018

(54) IMAGE CAPTURING APPARATUS AND CONTROL METHOD THEREOF

(71) Applicant: CANON KABUSHIKI KAISHA, Tokyo (JP)

(72) Inventor: Hiroyuki Ogino, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/085,251

(22) Filed: Mar. 30, 2016

(65) Prior Publication Data

US 2016/0295101 A1 Oct. 6, 2016

(30) Foreign Application Priority Data

Apr. 2, 2015 (JP) ................................ 2015-076310

(51) Int. Cl.
*H04N 5/232* (2006.01)
*H04N 5/14* (2006.01)

(52) U.S. Cl.
CPC ......... *H04N 5/23212* (2013.01); *H04N 5/145* (2013.01); *H04N 5/23219* (2013.01)

(58) Field of Classification Search
CPC . H04N 5/23212; H04N 5/23219; H04N 5/145
See application file for complete search history.

(56) References Cited

U.S. PATENT DOCUMENTS

| | | | | |
|---|---|---|---|---|
| 7,725,018 B2* | 5/2010 | Konishi | ................. | G03B 13/32 348/352 |
| 2014/0313373 A1* | 10/2014 | Sugawara | .......... | H04N 5/23212 348/239 |
| 2015/0215517 A1* | 7/2015 | Kusaka | .................. | G02B 7/282 348/353 |

FOREIGN PATENT DOCUMENTS

JP 2008-061157 A 3/2008

* cited by examiner

*Primary Examiner* — Padma Haliyur
(74) *Attorney, Agent, or Firm* — Cowan, Liebowitz & Latman, P.C.

(57) ABSTRACT

An image capturing apparatus comprises an object detection unit, a focus control unit, a shooting control unit, a focus detection unit, a prediction unit which predicts a position of the object, a setting unit which sets a focus detection area with respect to the position of the predicted object, a reliability acquisition unit which obtains a reliability regarding the focus detection area and an object moving amount acquisition unit which obtains a moving amount of the object based on the in-focus positions of the imaging optical system. Until the object detection result is obtained before the real shooting processing during continuous shooting, the focus control unit drives the imaging optical system based on the in-focus position indicated by detection results up until the previous real shooting processing, the reliability and the moving amount of the object.

11 Claims, 9 Drawing Sheets

IMAGE CAPTURING APPARATUS AND CONTROL METHOD THEREOF

BACKGROUND OF THE INVENTION

Field of the Invention

The present invention relates to an auto-focusing technique during continuous shooting.

Description of the Related Art

Conventionally, techniques for detecting an important object (main object) from an imaging screen are known, and in such techniques, a face identified from features such as a person's eyes and mouth, or a specific object identified from colors and luminance is detected as a main object, for example. Techniques for performing AF (automatic focus) using, as a focusing target, a main object specified by a user from an image displayed on a live view screen via a touch panel or the like are also known.

In addition, as an AF method, a contrast AF method is known, in which a high-frequency component of a luminance signal obtained from an image capturing unit is used as a focus evaluation value, and a position at which this focus evaluation value is a local maximum is used as an in-focus position. In this contrast AF method, a main object detected by the above-described object detection processing is set as a range-finding target area (also referred to as a focus detection area or an AF frame). In addition, as another AF method, a phase difference AF method is known, in which focus detection is performed based on an image signal obtained by an image capturing unit having pixels in which the pupil is divided by an imaging optical system such as a micro-lens. Furthermore, a hybrid AF method in which these two types of AF methods are combined is also known.

Japanese Patent Laid-Open No. 2008-061157 includes a first focusing control unit for performing AF using a phase difference detection method in a plurality of candidate areas in a screen, and specifying a focus detection area from the candidate areas based on a face detection result. A second focusing control unit is further included, which searches for a lens position at which a focus evaluation value in a face area is a local maximum value, based on an output from an image capturing unit, and at least either the first focusing control unit or the second focusing control unit executes a focusing operation.

On the other hand, a technique for updating an in-focus position by performing AF processing for each shooting frame in a camera having a continuous shooting function is known.

Incidentally, in the case of performing AF using a detection result of a main object during continuous shooting, AF cannot be performed until the detection result is obtained, and therefore a frame speed of continuous shooting decreases. In particular, focusing lens driving takes time to control, and if focusing lens is started after the detection result is obtained, there is a risk that the frame speed of continuous shooting will substantially decrease.

SUMMARY OF THE INVENTION

The present invention has been made in consideration of the aforementioned problems, and realizes, in AF processing during continuous shooting, a technique for shortening an AF processing time between continuous shooting frames, and suppressing a decrease in frame speed of the continuous shooting.

In order to solve the aforementioned problems, the present invention provides an image capturing apparatus comprising: an object detection unit configured to detect an object from an image captured by an image capturing unit; a focus control unit configured to drive an imaging optical system; a shooting control unit configured to perform continuous shooting in which shooting preparation processing and real shooting processing are repeated; a focus detection unit configured to detect an in-focus position of the imaging optical system using an image obtained by the real shooting processing; a prediction unit configured to predict a position of the object in the next real shooting processing, based on a detection result obtained by the object detection unit; a setting unit configured to set a focus detection area with respect to the position of the object predicted by the prediction unit; a reliability acquisition unit configured to obtain a reliability regarding the focus detection area set by the setting unit; and an object moving amount acquisition unit configured to obtain a moving amount of the object based on the in-focus positions of the imaging optical system detected by the focus detection unit, wherein until the detection result is obtained by the object detection unit before the real shooting processing during continuous shooting, the focus control unit drives the imaging optical system based on the in-focus position indicated by detection results up until the previous real shooting processing that are obtained by the focus detection unit, the reliability and the moving amount of the object.

In order to solve the aforementioned problems, the present invention provides a control method of an image capturing apparatus including an object detection unit configured to detect an object from an image captured by an image capturing unit; a focus control unit configured to drive an imaging optical system; a shooting control unit configured to perform continuous shooting in which shooting preparation processing and real shooting processing are repeated; and a focus detection unit configured to detect an in-focus position of the imaging optical system using an image obtained by the real shooting processing, the method comprising: predicting a position of the object in the next real shooting processing based on a detection result obtained by the object detection unit; setting a focus detection area with respect to the predicted position of the object; obtaining a reliability regarding the set focus detection area; obtaining a moving amount of the object based on the in-focus positions of the imaging optical system detected by the focus detection unit; and until the detection result is obtained by the object detection unit before the real shooting processing during continuous shooting, driving the imaging optical system based on the in-focus position indicated by detection results up until the previous real shooting processing that are obtained by the focus detection unit, the reliability and the moving amount of the object.

In order to solve the aforementioned problems, the present invention provides a computer-readable storage medium storing a program for causing a computer to function as each unit of an image capturing apparatus comprising: an object detection unit configured to detect an object from an image captured by an image capturing unit; a focus control unit configured to drive an imaging optical system; a shooting control unit configured to perform continuous shooting in which shooting preparation processing and real shooting processing are repeated; a focus detection unit configured to detect an in-focus position of the imaging optical system using an image obtained by the real shooting processing; a prediction unit configured to predict a position of the object in the next real shooting processing, based on a detection result obtained by the object detection unit; a setting unit configured to set a focus detection area with respect to the position of the object predicted by the prediction unit; a reliability acquisition unit configured to obtain a reliability regarding the focus detection area set by the setting unit; and an object moving amount acquisition unit configured to obtain a moving amount of the object based on the in-focus positions of the imaging optical system detected by the focus detection unit, wherein until the detection result is obtained by the object detection unit before the real shooting processing during continuous shooting, the focus control unit drives the imaging optical system based on the in-focus position indicated by detection results up until the previous real shooting processing that are obtained by the focus detection unit, the reliability and the moving amount of the object.

According to the present invention, in AF processing during continuous shooting, it is possible to shorten the AF processing time between continuous shooting frames, and suppress a decrease in frame speed of the continuous shooting.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

In this embodiment, an example will be described in which an image capturing apparatus of the present invention is realized by a digital camera having an automatic focus (AF) function, but the present invention can also be applied to electronic devices such as a smart phone, which is a type of mobile phone, and a tablet computer that have the AF function.

Apparatus Configuration

The configuration of the image capturing apparatus equipped with a focus detection apparatus that realizes the AF function of this embodiment will be described with reference to FIG. 1.

Figure 1:
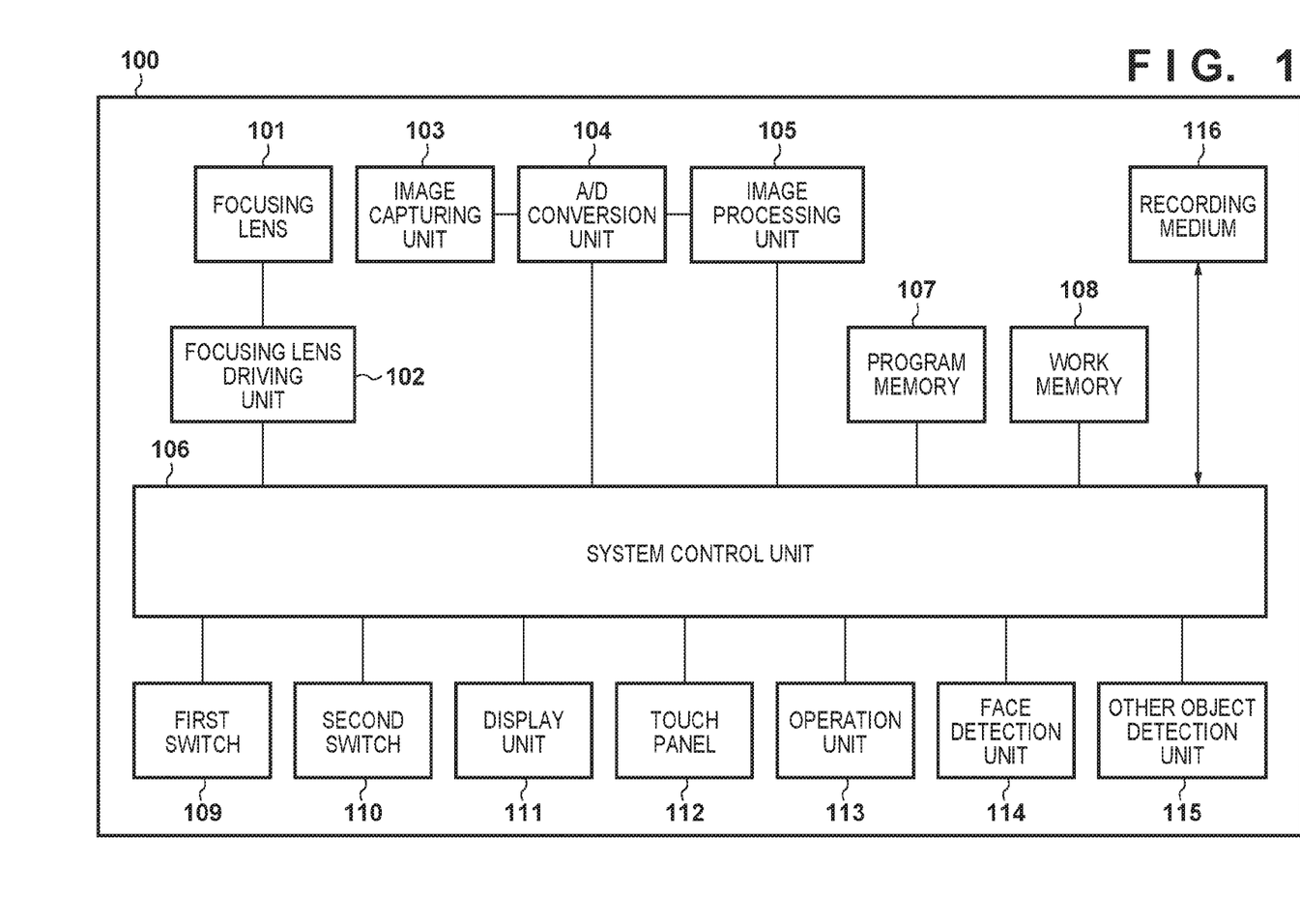
FIG. 1 is a block diagram showing an apparatus configuration of an embodiment according to the present invention.

In FIG. 1, a focusing lens 101 is used as an imaging optical system for bringing an imaging screen of an image capturing unit 103 (to be described later) into focus. A focusing lens driving unit 102 moves the focusing lens 101 along the optical axis of the focusing lens 101 by driving a stepping motor or the like in accordance with an instruction from a system control unit 106. The image capturing unit 103 is provided with a CMOS sensor for converting incident light from an object into an electrical signal, or the like.

Figure 2:
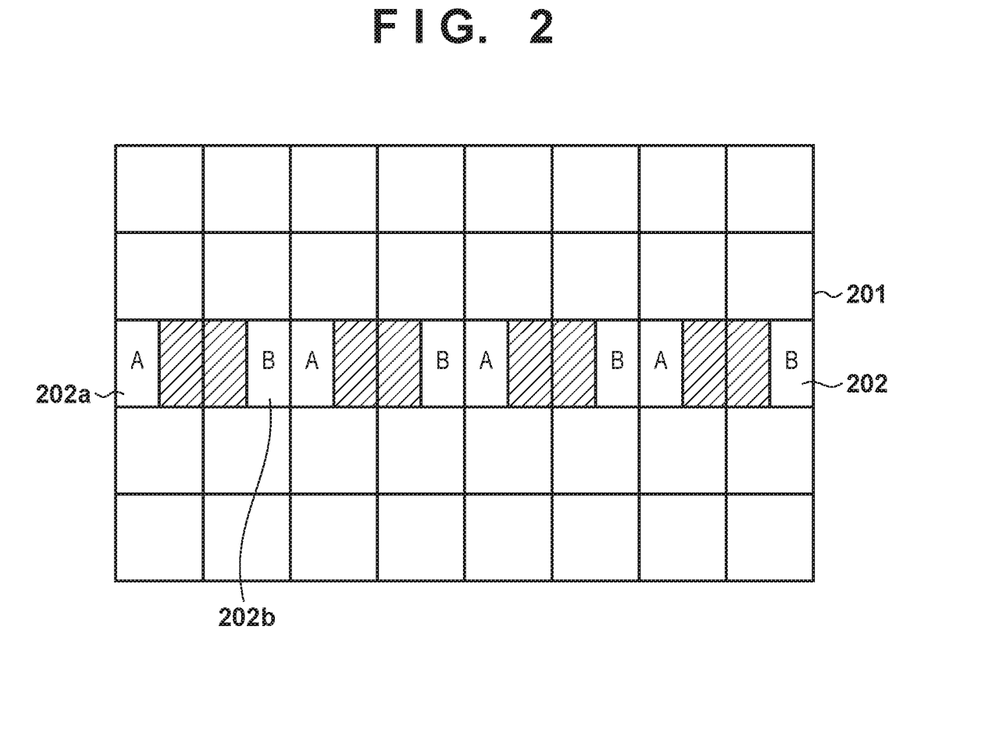
FIG. 2 is a diagram for describing pixels for focus detection that are used in phase difference AF performed by an image capturing unit.

As shown in FIG. 2, the image capturing unit 103 has normal pixels 201 and pixels 202 for phase difference AF. These pixels 202 for phase difference AF have an opening size approximately half the opening size of the normal pixels 201. Hatched portions of the pixels 202 for phase difference AF shown in FIG. 2 are portions in which light is shielded. In addition, the pixels 202 for phase difference AF include two types, namely, A pixels and B pixels which have different opening positions. A pixels 202a are open on the left side, and B pixels 202b are open on the right side. The phase difference AF is realized using a defocus amount obtained by performing correlation calculation on the image signals of the A pixels 202a and the image signals of the B pixels 202b. Note that the phase difference AF performed by the correlation calculation of a pair of images is a known technique. In addition, in order to simplify the description, only a row of the pixels 202 for phase difference AF is depicted in FIG. 2, however, in actuality, these pixels are arranged in a plurality of rows in a two-dimensional manner, and substantially cover the entirety of the imaging screen of the image capturing unit 103.

An A/D conversion unit 104 has a circuit for converting an analog signal output from the image capturing unit 103 into a digital signal.

An image processing unit 105 includes an image processing processer for performing predetermined processing on image data output from the A/D conversion unit 104.

The system control unit 106 is provided with a CPU and an MPU for controlling the entire apparatus such as a shooting sequence. In particular, the system control unit 106 functions as a shooting control unit for performing continuous shooting in which shooting preparation processing and real shooting processing are alternatively repeated as will be described later, a focus control unit for controlling AF (movement of the focusing lens 101) during continuous shooting, and a focus detection unit for detecting an in-focus position of the focusing lens 101 as an imaging optical system. The system control unit 106 also functions as a prediction unit for predicting the position of the object, a setting unit for setting a focus detection area, a reliability acquisition unit for obtaining the reliability of the in-focus position obtained by performing the phase difference AF, and an object moving amount acquisition unit for obtaining a moving amount of the object according to the present invention.

A program memory 107 is a ROM that stores a program that is executed by the system control unit 106.

A work memory 108 is a RAM for temporarily storing data required when the system control unit 106 performs processing in accordance with the program stored in the program memory 107.

A first switch 109 is a push-button switch that is turned on by half-pressing a release button, and that is for instructing shooting preparation processing such as automatic exposure control (AE) and AF.

A second switch 110 is a push-button switch that is turned on by fully pressing the release button, and that is for instructing real shooting processing such as shooting or recording of an image.

A display unit 111 is constituted by an LCD panel for displaying various information such as images captured by the image capturing unit 103, icons, and setting values, and the like.

A touch panel 112 is an input unit for instructing various operations and settings to a camera 100 by being touched by a user using his or her finger, a tip of a pen or the like. The touch panel 112 is installed overlapped on a display surface of the display unit 111, and touch sensor positions of the touch panel 112 are in one-to-one correspondence with positions on the display surface of the display unit 111. Hereinafter, touching a touch sensor position of the touch panel 112 that corresponds to an image or an icon displayed on the display unit 111 is expressed as touching the image or touching the icon.

An operation unit 113 includes a four-directional switch, a rotary dial and the like used for selection of menu items displayed in the display unit 111, an instruction to move a range-finding area (focus detection area) and the like.

A face detection unit 114 has a function of detecting a person's face in image data processed by the image processing unit 105. The face detection unit 114 functions as an object detection unit according to the present invention.

An other object detection unit 115 has a function of detecting an object other than a person's face in image data processed by the image processing unit 105.

A recording medium 116 records an image file generated by the image processing unit 105 in real shooting processing, which will be described later. The recording medium 116 is an internal or external hard disk drive or memory card, for example.

Shooting Processing

Next, shooting processing using the digital camera 100 of this embodiment will be described with reference to FIG. 3.

Figure 3:
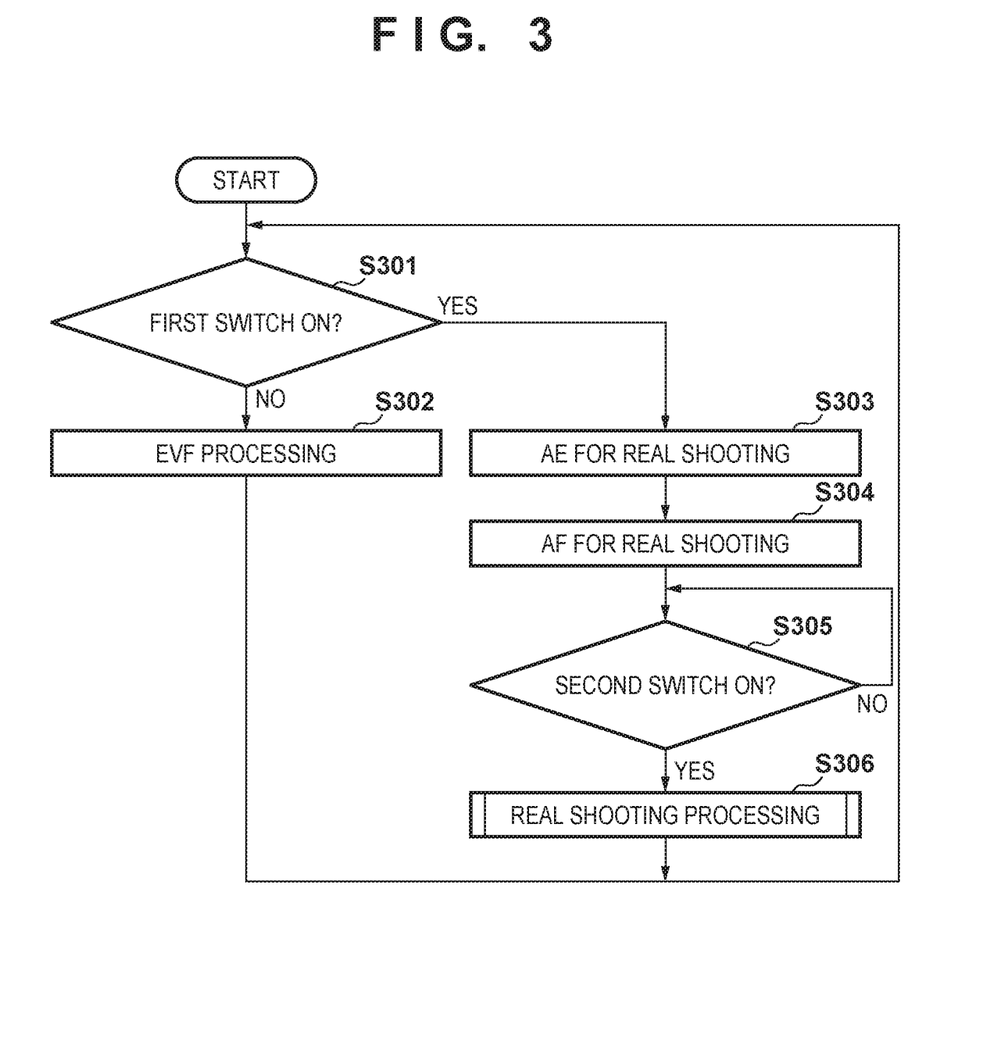
FIG. 3 is a flowchart showing shooting processing according to the embodiment.

Note that the processing in FIG. 3 is realized by the CPU of the system control unit 106 expanding a program read from the program memory 107 to the work memory 108, and executing the program. In addition, unless particularly stated otherwise, the CPU of the system control unit 106 stores various data such as calculation results and control parameters in the work memory 108. The same applies to a flowchart shown in FIGS. 4, 5 and 7 to 10, which will be described later.

In S301, the system control unit 106 detects an on/off state of the first switch 109, and determines whether or not a shooting preparation instruction was given. In the case where the first switch 109 is on, the process is advanced to S303 because a shooting preparation instruction was given, and in the case where the first switch 109 is off, the process is advanced to S302.

In S302, the system control unit 106 performs electronic view finder (EVF) processing for displaying a live view image during shooting preparation on the display unit 111. In this EVF processing, reading out of an image signal from the image capturing unit 103, AE, AF, automatic white balancing (AWB), developing processing, display processing and the like are performed.

In S303 and S304, the system control unit 106 respectively performs AE processing for real shooting and AF processing for real shooting. The AE processing for real shooting and the AF processing for real shooting are performed for the first frame of continuous shooting.

In S305, the system control unit 106 detects an on/off state of the second switch 110, and determines whether or not a real shooting instruction was given. In the case where the second switch 110 is on, the process is advanced to S306 because a real shooting instruction has been given, and in the case where the second switch 110 is off, the system control unit 106 waits until the second switch 110 is in an on state.

Figure 4:
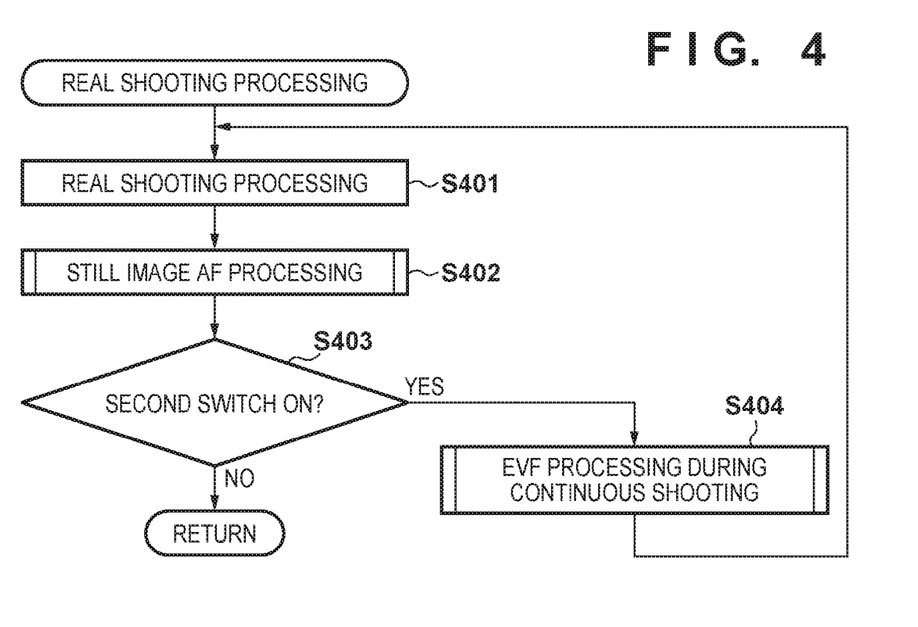
FIG. 4 is a flowchart showing real shooting processing in S306 in FIG. 3.

In S306, the system control unit 106 performs real shooting processing in accordance with a procedure that will be described later with reference to FIG. 4.

Real Shooting Processing

Next, the real shooting processing in S306 in FIG. 3 will be described with reference to FIG. 4.

In S401, the system control unit 106 performs the real shooting processing such as exposing and reading the image capturing unit 103, image processing by the image processing unit 105, and recording to the recording medium 116.

In S402, the system control unit 106 performs still image AF processing for obtaining, by performing the phase difference AF, in-focus positions of the focusing lens 101 from a still image obtained by performing the real shooting processing in accordance with a procedure that will be described later with reference to FIG. 5.

In S403, the system control unit 106 detects an on/off state of the second switch 110 and determines whether or not an actual-shooting instruction was given. In the case where the second switch 110 is on, the process is advanced to S404 because an actual-shooting instruction was given, and in the case where the second switch 110 is off, this process ends.

In S404, the system control unit 106 performs EVF processing during continuous shooting for inserting live view images at continuous shooting intervals in accordance with a procedure that will be described later with reference to FIG. 7.

In this manner, the continuous shooting, in which the EVF processing for displaying live view images on the display unit 111 is inserted, is performed by repeating the real shooting processing and the EVF processing while the second switch 110 is on, in other words, while the actual-shooting instruction is continuing.

Still Image AF Processing

Next, still image AF processing in S402 in FIG. 4 for obtaining in-focus positions of the focusing lens 101 from a still image by performing phase difference AF will be described with reference to FIG. 5.

In S501, the system control unit 106 sets a plurality of pixel positions for phase difference AF so as to substantially cover the entity of the imaging screen of the image capturing unit 103.

In S502, the system control unit 106 sets a plurality of pixel ranges (focus detection areas) for phase difference AF, centered on the pixel positions set in S501.

In S503, the system control unit 106 performs correlation calculation using the pixels for phase difference AF set in S501 and S502. The result of the correlation calculation is calculated for each of the pixel positions set in S501. The in-focus positions of the focusing lens 101 obtained by performing this correlation calculation are stored in the work memory 108. At this time, position information of the focusing lens 101 is calculated for each of the pixel positions set in S501. The in-focus positions of the focusing lens 101 calculated in this manner indicate focal distances of the areas obtained by dividing the entity of the imaging screen.

In S504, the system control unit 106 calculates the reliability of the correlation calculation results calculated in S503. The calculation of reliability is performed based on the level of the signals of the pixels for phase difference AF and the degree to which the A and B images match. The reliability results include two types, namely, high and low. Similarly to the correlation calculation results, this reliability is calculated for each of the pixel positions set in S501, and is stored in the work memory 108.

Figure 5:
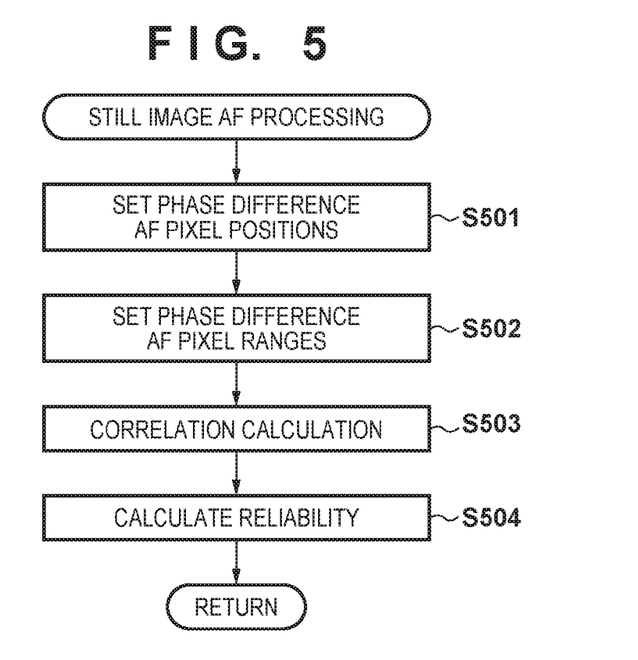
FIG. 5 is a flowchart showing still image AF processing in S402 in FIG. 4.
Figure 6:
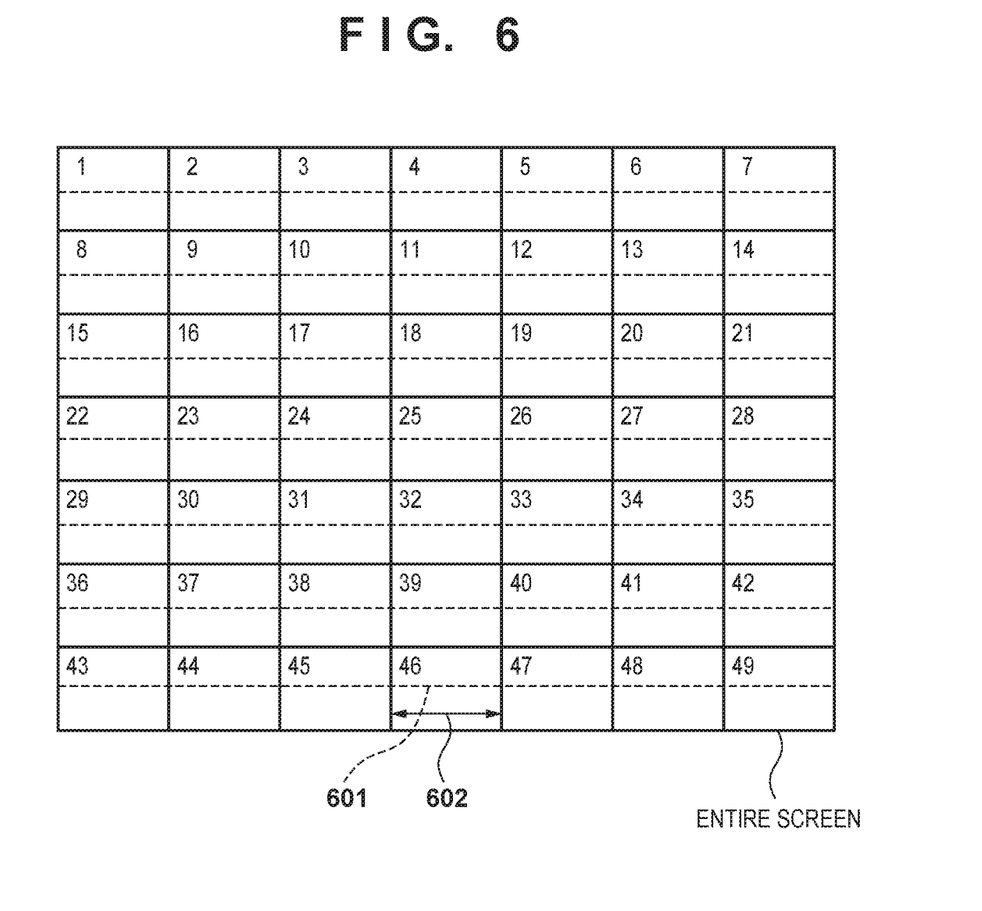
FIG. 6 is a diagram for describing positions and ranges of normal pixels and pixels for focus detection of an image capturing unit.

FIG. 6 illustrates the pixel positions and pixel ranges for phase difference AF set in S501 and S502 in FIG. 5. In FIG. 6, the entity of the imaging screen is divided into seven areas vertically and seven areas horizontally. Portions indicated by solid lines are the divided areas. The pixels for phase difference AF are arranged in the horizontal direction in the center of the vertically divided seven areas. Portions indicated by dotted lines in FIG. 6 indicate pixel lines for phase difference AF. In FIG. 6, the pixel positions for phase difference AF that were set in S501 in FIG. 5 indicate center positions 601 of the divided areas in FIG. 6, and the pixel ranges for phase difference AF that were set in S502 indicate ranges 602 in the horizontal direction of the divided area in FIG. 6.

EVF Processing During Continuous Shooting

Next, the EVF processing during continuous shooting in S404 in FIG. 4 will be described with reference to FIG. 7.

In S701, the system control unit 106 performs EVF processing similar to that in S302 in FIG. 3.

In S702, the system control unit 106 starts face detection processing on image data read out from the image capturing unit 103 in the EVF processing in S701 and processed by the image processing unit 105, using the face detection unit 114.

In S703, the system control unit 106 predicts a face position of the object in the imaging screen in the next real shooting processing based on a face position stored in S902, which will be described later with reference to FIG. 9.

In S704, the system control unit 106 selects a pixel position for phase difference AF in FIG. 6 based on the face position predicted in S703. Here, the system control unit 106 selects a pixel position for phase difference AF that is closest to the center of the face position predicted in S703.

In S705, the system control unit 106 acquires the reliability of the correlation calculation result calculated in S504 in FIG. 5 regarding the pixel position for phase difference AF that was selected in S704.

In S706, the system control unit 106 calculates a moving amount of the object up until the previous shooting frame based on an in-focus position stored in S710 that will be described later.

In S707, the system control unit 106 performs processing for driving the focusing lens 101 up until a face is detected in accordance with a procedure that will be described later with reference to FIG. 8.

In S708, the system control unit 106 determines a driving pattern of the focusing lens 101 that will be described later with reference to FIG. 8. In the case of pattern 2, the process is advanced to S710, and otherwise the process is advanced to S709.

In S709, the system control unit 106 performs processing after face detection in accordance with a procedure that will be described later with reference to FIG. 9.

In S710, the system control unit 106 stores the in-focus position of the focusing lens 101 in the work memory 108. This in-focus position is stored for all the shooting frames shot during continuous shooting.

Focusing Lens Driving Processing

Next, driving processing of the focusing lens 101 before face detection in S707 in FIG. 7 will be described with reference to FIG. 8.

Figure 7:
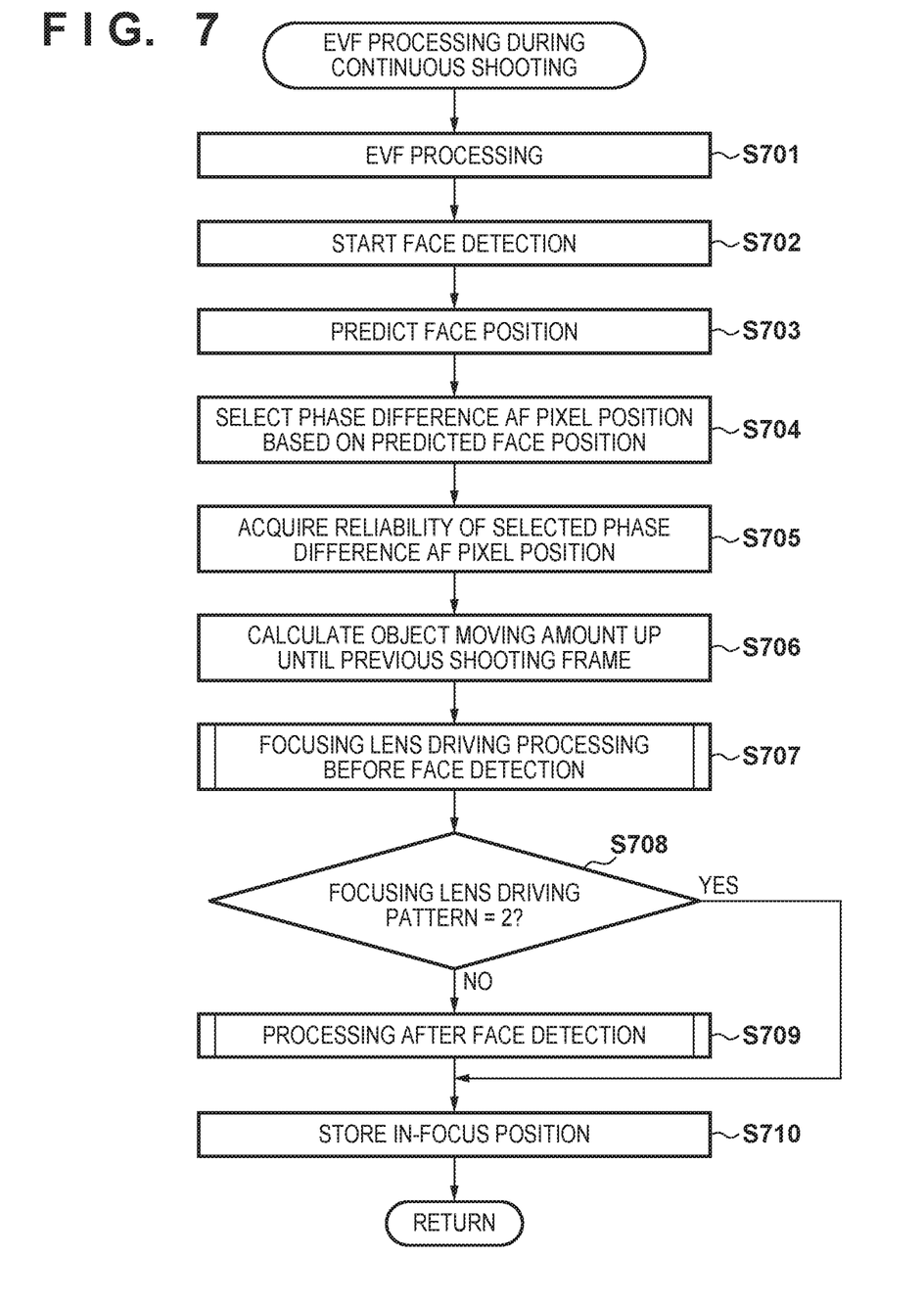
FIG. 7 is a flowchart showing EVF processing during continuous shooting in S404 in FIG. 4.

In S801, the system control unit 106 determines the reliability acquired in S705 in FIG. 7. If the reliability is high, the process is advanced to S802, and otherwise the process is advanced to S807.

In S802, the system control unit 106 determines whether or not the object moving amount up until the previous shooting frame that was calculated in S706 in FIG. 7 is greater than a predetermined amount. In the case where the object moving amount is greater than the predetermined amount, the process is advanced to S803, and otherwise the process is advanced to S805.

In S803, the system control unit 106 stores 1 as the driving pattern of the focusing lens 101 in the work memory 108.

In S804, the system control unit 106 drives the focusing lens 101 in the direction of the in-focus position at the pixel position for phase difference AF that was selected in S704 in FIG. 7.

In S805, the system control unit 106 stores 2 as the driving pattern of the focusing lens 101 in the work memory 108.

In S806, the system control unit 106 drives the focusing lens 101 to the in-focus position at the pixel position for phase difference AF that was selected in S704 in FIG. 7.

In S807, the system control unit 106 determines whether or not the object moving amount up until the previous shooting frame that was calculated in S706 in FIG. 7 is greater than a predetermined amount. In the case where the object moving amount is greater than the predetermined amount, the process is advanced to S808, and otherwise the process is advanced to S810.

In S808, the system control unit 106 stores 3 as the driving pattern of the focusing lens 101 in the work memory 108.

In S809, the system control unit 106 drives the focusing lens 101 in the direction of the in-focus position at the pixel position for phase difference AF that was selected in S704 in FIG. 7.

In S810, the system control unit 106 stores 4 as the driving pattern of the focusing lens 101 in the work memory 108.

Processing after Face Detection

Next, the processing after face detection in S709 in FIG. 7 will be described with reference to FIG. 9.

In S901, the system control unit 106 determines whether or not the face detection processing by the face detection unit 114 has been completed. In the case where the face detection processing has been completed, the process is advanced to S902, and otherwise the process is returned to S901 and the determination is repeated.

In S902, the system control unit 106 stores, in the work memory 108, the position of the face in the screen that was detected in the face detection processing. This face position is stored for all the shooting frames shot during continuous shooting.

Figure 8:
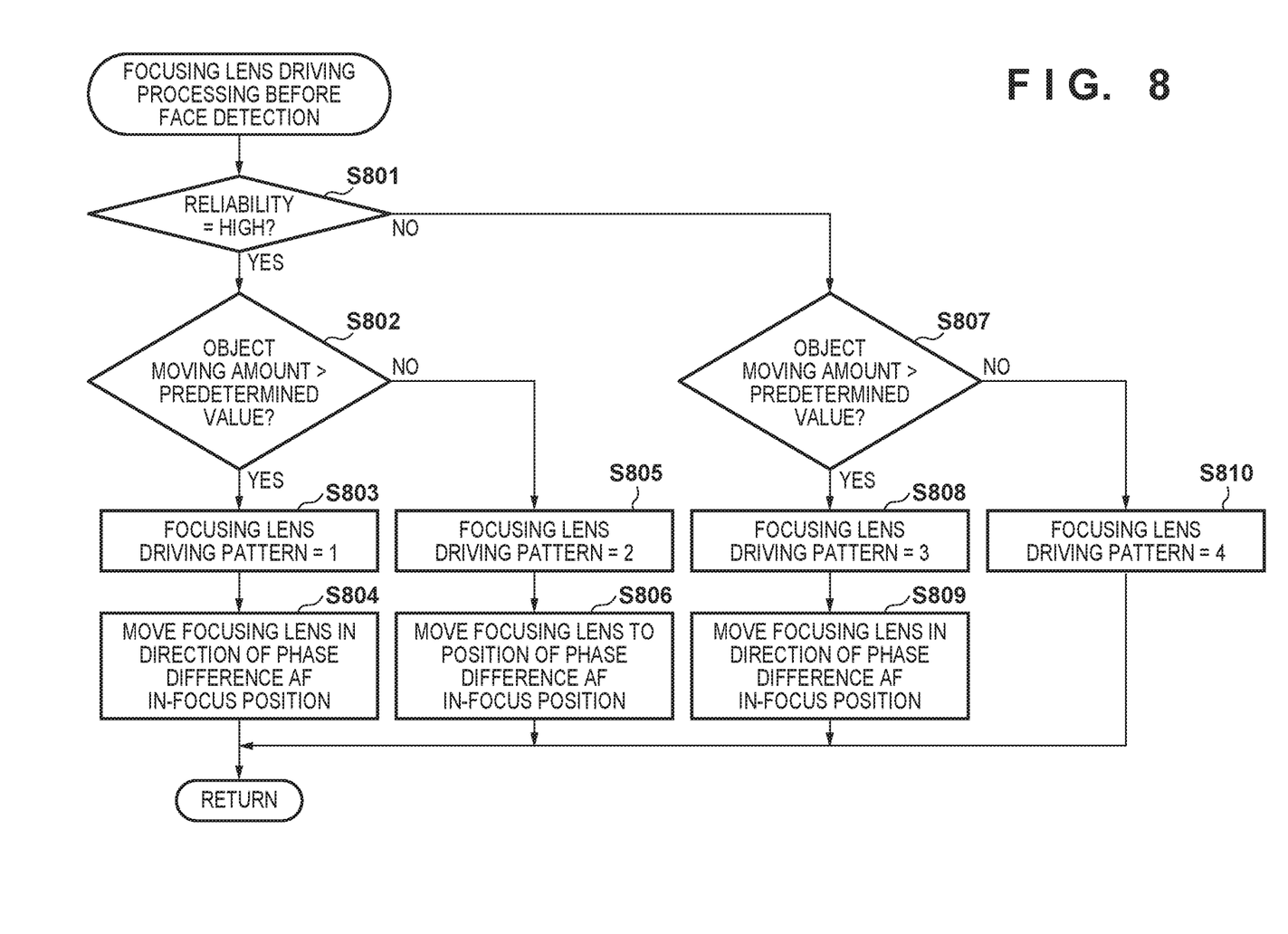
FIG. 8 is a flowchart showing focusing lens driving processing before face detection in S707 in FIG. 7.

In S903, the system control unit 106 determines the driving pattern of the focusing lens 101 that was stored in the processing in FIG. 8. In the case of pattern 1, the process is advanced to S904, and otherwise the process is advanced to S906.

In S904, the system control unit 106 selects a pixel position for phase difference AF in FIG. 6 based on the face positions stored in S902. Here, the system control unit 106 selects a pixel position for phase difference AF that is closest to the center of the face positions stored in S902.

In S905, the system control unit 106 drives the focusing lens 101 to the in-focus position at the pixel position for phase difference AF selected in S904.

In S906, the system control unit 106 performs contrast AF processing in accordance with a procedure that will be described later with reference to FIG. 10.

Contrast AF Processing

Next, the contrast AF processing in S906 in FIG. 9 will be described with reference to FIG. 10.

In S1001, the system control unit 106 determines the driving pattern of the focusing lens 101 stored in FIG. 8. In the case of pattern 4, the process is advanced to S1002, and otherwise the process is advanced to S1003.

In S1002, the system control unit 106 moves the focusing lens 101 to the initial position. This initial position is a position to which the focusing lens 101 moved from the present position to the infinity side by a predetermined amount.

In S1003, the system control unit 106 stops the movement of the focusing lens 101. In this case, the movement is temporarily stopped, because the driving pattern of the focusing lens 101 stored in FIG. 8 is pattern 3, and the focusing lens 101 has been already driven based on the phase difference AF result.

Figure 9:
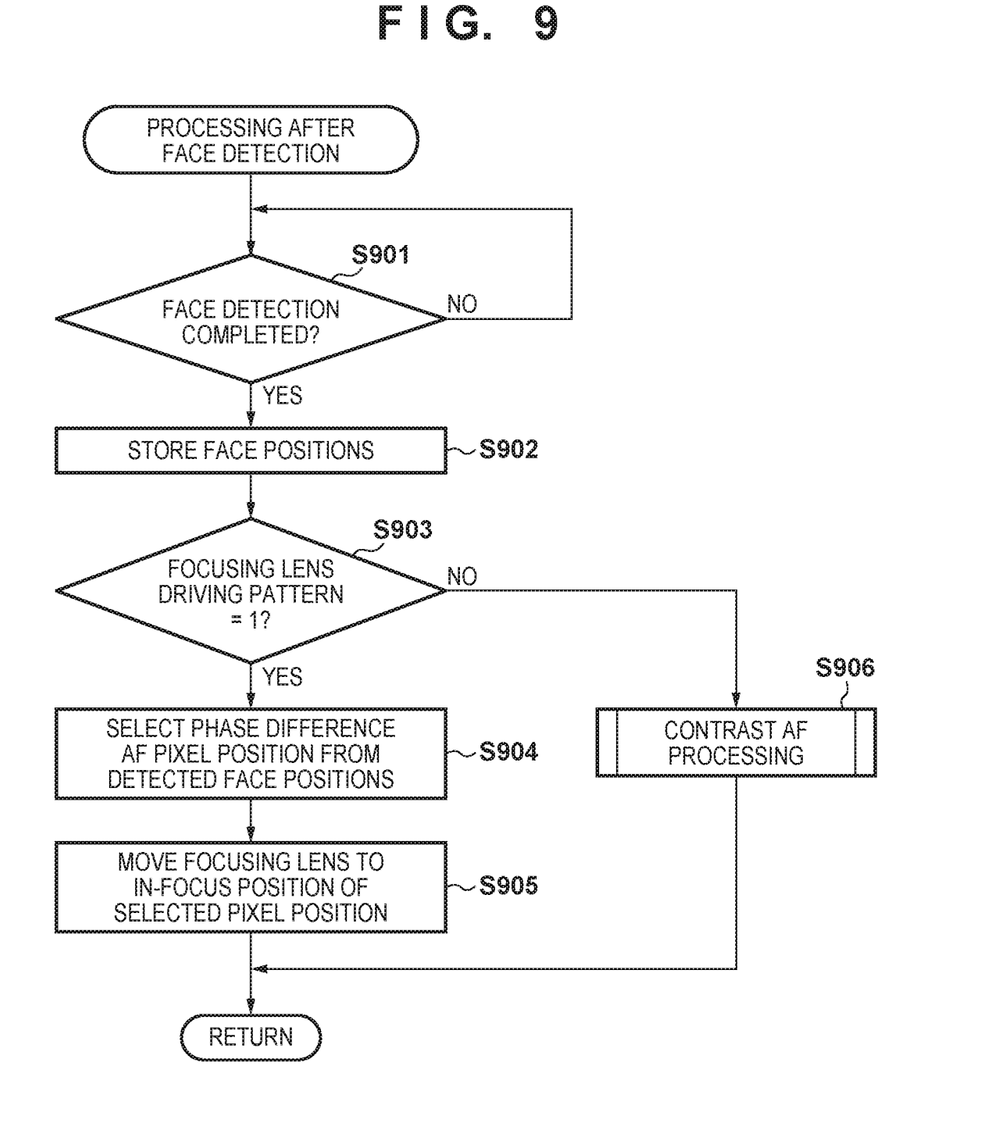
FIG. 9 is a flowchart showing processing after face detection in S709 in FIG. 7.
Figure 10:
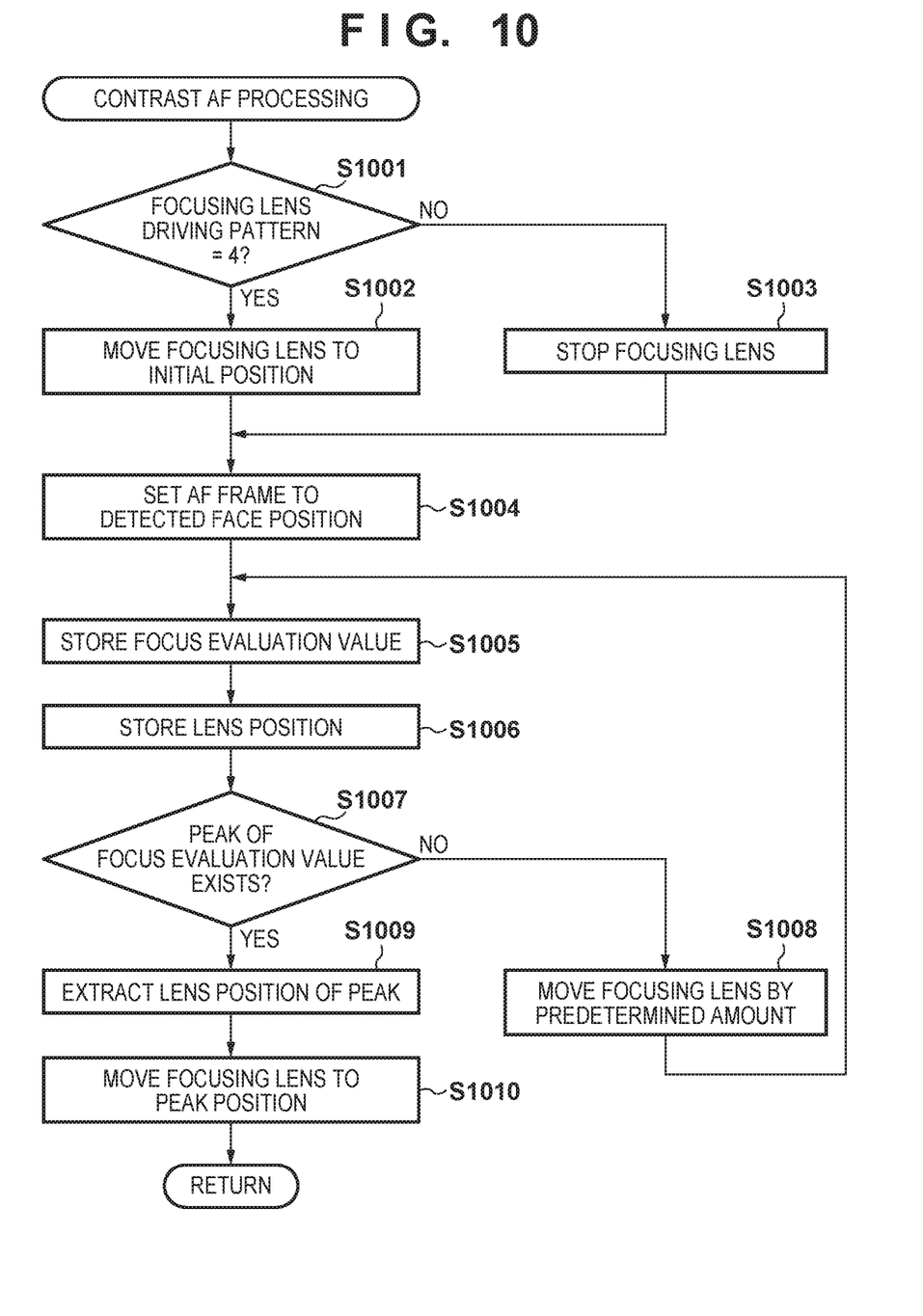
FIG. 10 is a flowchart showing contrast AF processing in S906 in FIG. 9.

In S1004, the system control unit 106 sets an AF frame to the face position stored in S902 in FIG. 9.

In S1005, the system control unit 106 converts an analog signal read out from the image capturing unit 103 into a digital signal using the A/D conversion unit 104, extracts a high-frequency component of a luminance signal using the image processing unit 105, and stores it as a focus evaluation value.

In S1006, the system control unit 106 stores the present position of the focusing lens 101. In the case where a stepping motor is used for the focusing lens driving unit 102, the number of driving pulses from an initial position (not illustrated) is used as the position of the focusing lens 101.

In S1007, the system control unit 106 determines whether or not there is a peak in the focus evaluation value stored in S1005. In the case where there is a peak, the process is advanced to S1009, and in the case where there is no peak, the process is advanced to S1008. In this focus evaluation value peak determination, it is determined whether or not there is a local maximum value in the focus evaluation value in the case where the focus evaluation value stored in S1005 is corresponded to the position of the focusing lens 101 stored in S1006.

In S1008, the system control unit 106 moves the focusing lens 101 by a predetermined amount. It is assumed that, in the case where the driving pattern of the focusing lens 101 is 4, the movement direction in this case is a direction opposite to the direction in which the focusing lens 101 moved in S1002. It is assumed that, in the case where the driving pattern of the focusing lens 101 is 3, the movement direction is the direction in which the focusing lens 101 moved in S809 in FIG. 8.

In S1009, the system control unit 106 extracts the position of the focusing lens 101 corresponding to the local maximum value of the focus evaluation value determined in S1007, in other words, the lens position at the peak.

In S1010, the system control unit 106 moves the focusing lens 101 to the peak position extracted in S1009.

When performing AF using face information between the shooting frames during continuous shooting, before obtaining a face detection result, the focusing lens 101 can be driven based on the result of performing the phase difference AF on a shot still image, the face information up until the previous shooting frame and the object moving amount, by performing the processing in FIGS. 7 to 10.

First, the phase difference AF is performed on the still image obtained by performing the real shooting processing, and the in-focus positions at a plurality of pixel positions for phase difference AF in the screen are calculated. Next, the present face position is predicted from the face positions up until the previous shooting frame. Then, a pixel position that is the closest to the face position predicted is selected from the plurality of pixel positions for phase difference AF, and the reliability of the phase difference AF at the pixel position is acquired. Furthermore, the object moving amount is calculated from the in-focus positions up until the previous shooting frame.

Based on the information obtained in this manner, the driving pattern of the focusing lens 101 is determined from among the following driving patterns.

Driving Pattern 1: Case where Reliability of Phase Difference AF is High, and Moving Amount of Object is Large Until the face detection result in the present shooting frame is obtained, the focusing lens 101 is moved in the direction of the in-focus position indicated by the result of the phase difference AF at the position closest to the predicted face position. After that, when the face detection result in the present shooting frame is obtained, the focusing lens 101 is moved to the in-focus position indicated by the result of the phase difference AF at the position closest to the detected face position, and the AF processing ends.

In driving pattern 1, the reliability of the phase difference AF is high, and therefore the result can be used directly. However, the moving amount of the object is large, and therefore it is necessary to move the focusing lens 101 by a large amount. In that case, it is possible that a detection error of the phase difference AF will become large, and therefore, when the face detection result in the present shooting frame is obtained, the pixel position for phase difference AF to be used is changed to the final in-focus position.

Driving Pattern 2: Case where Reliability of Phase Difference AF is High, and Moving Amount of Object is Small The object moving amount is small, and therefore even if the result of the phase difference AF at the position closest to the predicted face position is used as the final in-focus position, it can be determined that the focusing lens 101 will never become considerably out of focus. Therefore, even before the face detection result in the present shooting frame is obtained, the focusing lens 101 is moved to the in-focus position indicated by the result of the phase difference AF at the position closest to the predicted face position, and the AF processing ends.

Driving Pattern 3: Case where Reliability of Phase Difference AF is Low, and Moving Amount of Object is Large Until the face detection result in the present shooting frame is obtained, the focusing lens 101 is moved in the direction of the in-focus position indicated by the result of the phase difference AF at the position closest to the predicted face position. After that, when the face detection result in the present shooting frame is obtained, an AF frame is set at the detected face position and contrast AF is performed. The reliability of the phase difference AF is low, and therefore the ultimate in-focus position is obtained by performing contrast AF.

Driving Pattern 4: Case where Reliability of Phase Difference AF is Low, and Moving Amount of Object is Small The moving amount of the object is small, and therefore if the result of the phase difference AF whose reliability is low is used, there is a risk that the focusing lens 101 is moved in a direction opposite to the in-focus position.

Therefore, until the face detection result in the present shooting frame is obtained, the focusing lens 101 is not moved. When the face detection result in the present shooting frame is obtained, an AF frame is set at the detected face position, and contrast AF is performed.

As described above, according to this embodiment, in the AF processing during continuous shooting, the focusing lens 101 can be moved without waiting for the face detection result, and therefore the AF processing time between the shooting frames during continuous shooting can be shortened, making it possible to suppress a decrease in frame speed during continuous shooting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-076310, filed Apr. 2, 2015 which is hereby incorporated by reference herein in its entirety.

What is claimed is:

1. An image capturing apparatus comprising:
at least one processor or at least one circuit, which functions and operates as:
a detection unit configured to detect a defocus state of an object image;
an object detection unit configured to detect an object from an image captured by an image capturing unit including a plurality of pixels;
a focus control unit configured to control a focus position of an imaging optical system;
a shooting control unit configured to perform continuous shooting in which shooting preparation processing and real shooting processing are repeated;
a focus detection unit configured to detect an in-focus position of the imaging optical system using an image obtained by the real shooting processing;
a prediction unit configured to predict an object position in an imaging screen in the next real shooting processing, based on a detection result obtained by the object detection unit;
a setting unit configured to set a focus detection area for the focus detection unit by selecting the pixels of the image capturing unit for in-focus position detection with respect to the object position predicted by the prediction unit;
a reliability acquisition unit configured to obtain a reliability regarding the focus detection area set by the setting unit; and
an object moving amount acquisition unit configured to obtain a moving amount of the object based on the in-focus positions of the imaging optical system detected by the focus detection unit,
wherein until the detection result is obtained by the object detection unit before the real shooting processing during continuous shooting, the focus control unit drives the imaging optical system based on the in-focus position indicated by detection results up until the previous real shooting processing that are obtained by the focus detection unit, the reliability and the moving amount of the object,
wherein in a case where it is determined that the reliability is low and that the moving amount of the object is large, the focus control unit controls the focus position of the imaging optical system such that the focus position moves in a direction of the in-focus position indicated by the detection results up until the previous real shooting processing that are obtained by the focus detection unit, until the detection result is obtained by the object detection unit.

2. The apparatus according to claim 1, wherein the focus detection unit calculates the in-focus position by performing a correlation calculation on a pair of image signals captured by the image capturing unit.

3. The apparatus according to claim 1, wherein in a case where it is determined that the reliability is high and that the moving amount of the object is large, the focus control unit controls the focus position of the imaging optical system such that the focus position moves in a direction of the in-focus position indicated by the detection results up until the previous real shooting processing that are obtained by the focus detection unit, until the detection result is obtained by the object detection unit, and, when the detection result is obtained by the object detection unit, moves to the in-focus position indicated by the detection result obtained in the present real shooting processing.

4. The apparatus according to claim 1, wherein in a case where it is determined that the reliability is high and that the moving amount of the object is small, the focus control unit drives the imaging optical system to the in-focus position indicated by the detection results up until the previous real shooting processing that are obtained by the focus detection unit.

5. The apparatus according to claim 2, wherein the focus detection unit includes a second focus detection unit configured to use, as the in-focus position, a position at which a high-frequency component of a luminance signal of the image obtained by the image capturing unit while moving the imaging optical system using the focus control unit is a local maximum, and in a case where it is determined that the reliability is low and that the moving amount of the object is large, the focus control unit controls the focus position of the imaging optical system such that the focus position moves to the in-focus position detected by the second focus detection unit when the detection result is obtained by the object detection unit.

6. The apparatus according to claim 2, wherein the focus detection unit includes a second focus detection unit configured to use, as the in-focus position, a position at which a high-frequency component of a luminance signal of the image obtained by the image capturing unit while moving the imaging optical system using the focus control unit is a local maximum, and in a case where it is determined that the reliability is low and that the moving amount of object is small, the focus control unit control the focus position of the imaging optical system such that the focus position does not move until the detection result is obtained by the object detection unit, and, when the detection result is obtained by the object detection unit, drives the imaging optical system to the in-focus position detected by the second focus detection unit.

7. The apparatus according claim 1, wherein the object detection unit detects a face of a person.

8. A control method of an image capturing apparatus including at least one processor or at least one circuit, which functions as an object detection unit configured to detect an object tern an image captured by an image capturing unit including a plurality of pixels; a focus control unit configured to control a focus position of an imaging optical system; a shooting control unit configured to perform continuous shooting in which shooting preparation processing and real shooting processing are repeated; and a focus detection unit configured to detect an in-focus position of the imaging optical system using an image obtained by the real shooting processing, the method compromising:

predicting an object position in an imaging screen in the next real shooting processing based on a detection result obtained by the object detection unit;

setting a focus detection area for the focus detection unit by selecting the pixels of the image capturing unit for in-focus position detection with respect to the predicted object position;

obtaining a reliability regarding the set foots detection area;

obtaining a moving amount of the object based on the in-focus positions of the imaging optical system detected by the focus detection unit; and until the detection result is obtained by the object detection unit before the real shooting processing during continuous shooting, driving the imaging optical system based on the in-focus position indicated by detection results up until the previous real shooting processing that are obtained by the focus detection unit, the reliability and the moving amount of the object, wherein in a case where it is determined that the reliability is low and that the moving amount of the object is large, the focus control unit controls the focus position of the imaging optical system such that the focus position moves in a direction of the in-focus position indicated by the detection results up until the previous real shooting processing that are obtained by the focus detection unit, until the detection result is obtained by the object detection unit.

9. A non-transitory computer-readable storage medium storing a program operable and executable by at least one processor or at least one circuit, for causing a computer to function as each image capturing apparatus comprising:

a detection unit configured to detect a defocus state of an object image;

an object detection unit configured to detect an object from an image captured by an image capturing unit including a plurality of pixels;

a focus control unit configure to control focus position of an imaging optical system;

a shooting control unit configured to perform continuous shooting in which shooting preparation processing and real shooting processing are repeated;

a focus detection unit configured to detect an in-focus position of the imaging optical system using an image obtained by the real shooting processing;

a prediction unit configured to predict an object position in an imaging screen in the next real shooting processing, based on a detection result obtained by the object detection unit;

a setting unit configured to set a focus detection area for the focus detection unit by selecting the pixels of the image capturing unit for in-focus position detection with respect to the object position predicted by the prediction unit;

a reliability acquisition unit configured to obtain a reliability regarding the focus detection area set by the setting unit; and an object moving amount acquisition unit configured to obtain a moving amount of the object based on the in-focus positions of the imaging optical system detected by the focus detection unit, wherein until the detection result is obtained by the object detection unit before the real shooting processing during continuous shooting, the focus control unit drives the imaging optical system based on the in-focus position indicated by detection results up until the previous real shooting processing that are obtained by the focus detection unit, the reliability and the moving amount of the object, wherein in a case where it is determined that the reliability is low and that the moving amount of the object is large, the focus control unit controls the focus position of the imaging optical system such that the focus position moves in a direction of the in-focus position indicated by the detection results up until the previous real shooting processing that are obtained by the focus detection unit, until the detection result is obtained by the object detection unit.

10. The apparatus according to claim 1, wherein in a case where it is determined that the reliability is low and that the moving amount of the object is small, the focus control unit controls the focus position of the imaging optical system such that the focus position does not move until the detection result is obtained by the object detection unit.

11. The apparatus according to claim 1, wherein the setting unit changes the pixel to be selected with respect to the object position predicted by the prediction unit.

* * * * *